Patented Sept. 1, 1931

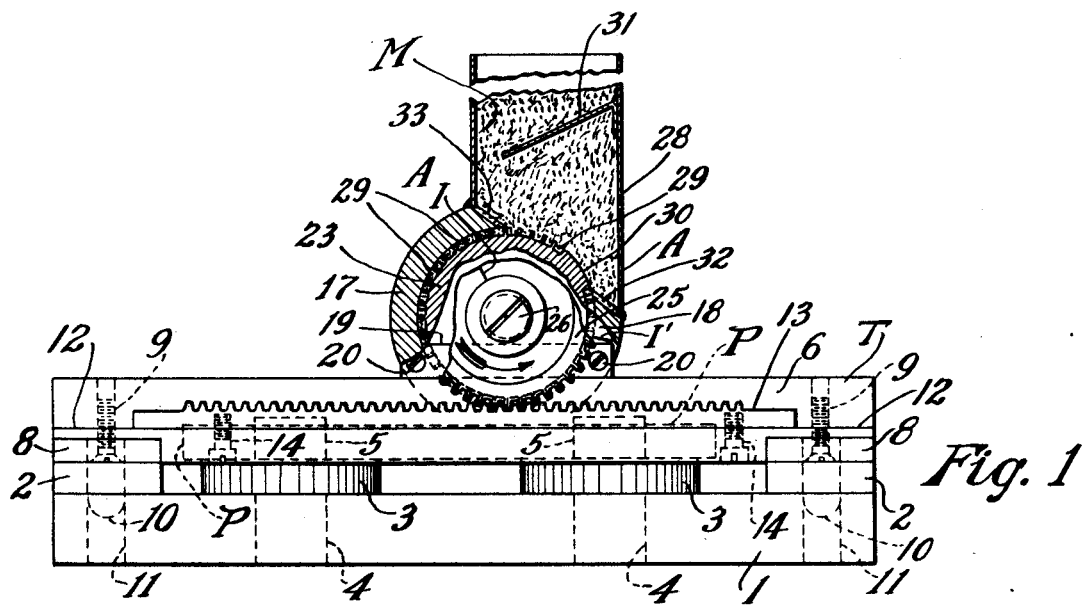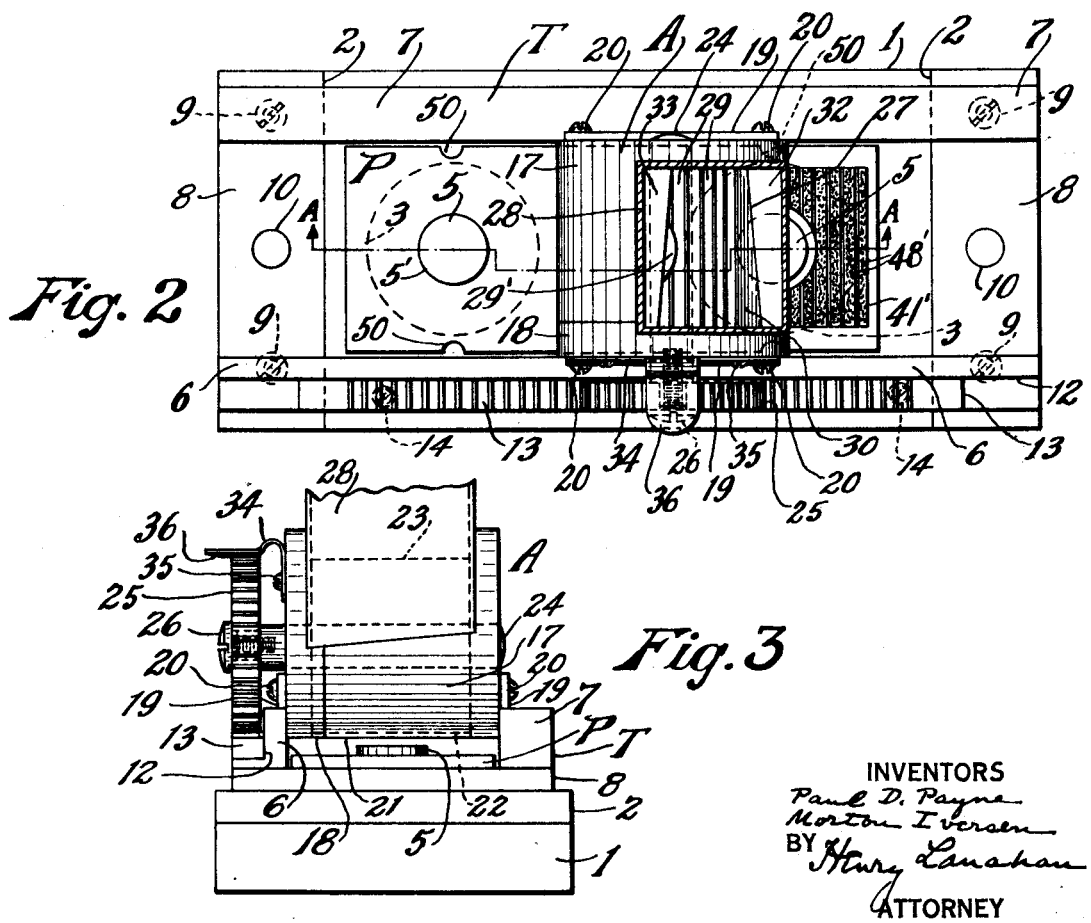

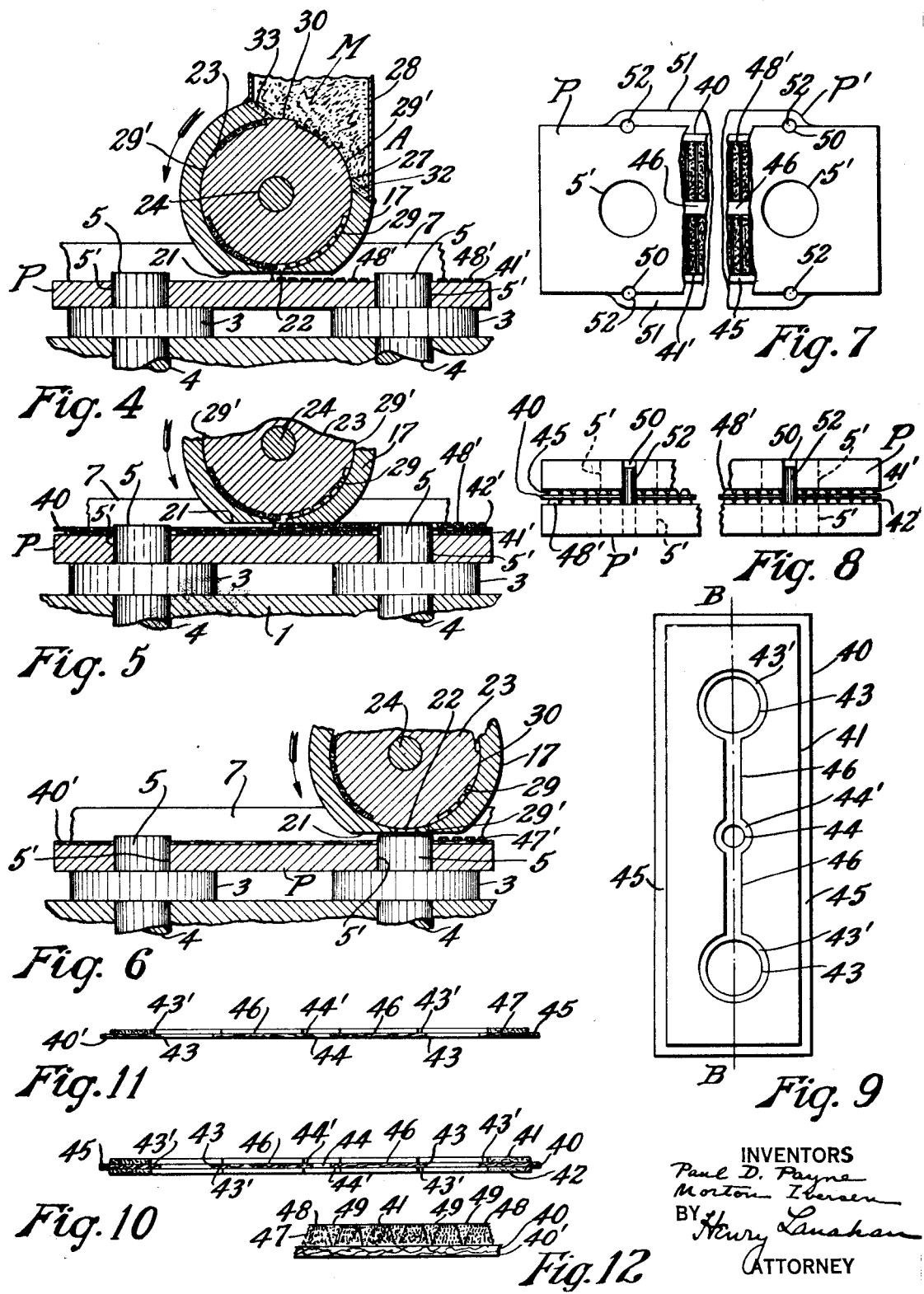

1,821,572

UNITED STATES PATENT OFFICE

PAUL D. PAYNE, OF IRVINGTON, NEW JERSEY, AND MORTON IVERSEN, OF BROOKLYN, NEW YORK, ASSIGNORS TO THOMAS A. EDISON, INCORPORATED, OF WEST ORANGE, NEW JERSEY, A CORPORATION OF NEW JERSEY

STORAGE BATTERY ELEMENT AND THE PRODUCTION THEREOF

Application filed June 4, 1926. Serial No. 113,613.

Our invention relates to electrode elements for storage battery cells, and more particularly to electrode elements designed for use in storage battery cells having the same general characteristics as the cell disclosed in Patent No. 1,377,194 granted to Thomas A. Edison on May 10, 1921, and to the production of such elements. Although electrode elements in accordance with our invention are designed especially for use in connection with storage battery cells wherein nickel hydroxide is opposed to finely divided electrolytically active iron or oxide of iron in an alkaline solution as the electrolyte, it is to be distinctly understood that our invention is not limited in its application to cells of this type.

In the cell disclosed in the Edison patent referred to, a battery pile of special construction is employed in place of the usual plate assembly in storage battery cells of the nickel iron alkaline type. This battery pile comprises a series of very thin conductive contact sheets, preferably of nickel, separated by insulating sheets, preferably of asbestos paper, with thin flat layers of finely divided active material respectively disposed between the surfaces of each of the nickel sheets and the adjacent asbestos sheets, the whole being held together under great pressure with the layers of active material in firm close surface contact with the respective nickel sheets. The layers of active material for the negative elements preferably consist of electrolytically active finely divided iron or oxide of iron, preferably mixed with a small amount of mercury, and the layers of active material for the positive elements preferably consist of finely divided nickel hydroxide. Other suitable active materials may, however, be employed instead of the finely divided iron and nickel hydroxide; for example, in place of finely divided iron as the active material for the negative elements, finely divided cadmium or cobalt, or a mixture of iron and cadmium or cobalt, may be employed; and in place of nickel hydroxide as the active material for the positive elements, an oxide of cobalt may be employed.

Heretofore, a battery pile such as that described above has been made up as follows: The insulating sheets, preferably of asbestos, used in the battery pile were first coated on one side with a thin layer of finely divided iron or oxide of iron, and on the other side with a thin layer of nickel hydroxide. These coated asbestos sheets were then subjected to enormous pressure so as to compact the layers of active material and form the same with very smooth flat surfaces. The proper number of coated asbestos sheets were then superimposed with one of the thin nickel contact sheets between each two adjacent asbestos sheets in such a manner that one of each two adjacent nickel sheets was engaged on each side with a layer of electrolytically active iron or oxide of iron and the other was engaged on each side with a layer of the electrolytically active nickel hydroxide, so as to form a pile with electrode elements which were alternately negative and positive. This pile was then subjected to great pressure and secured together under pressure by means of heavy clamping or pressure plates at either end of the pile and two bolts or rods extending through the clamping plates and also through the elements of the pile and nuts threaded on said rods. These rods served as the poles of the battery pile, for one of said rods contacted only the contact sheets of the negative electrode elements of the pile, and the other of said rods contacted only the contact sheets of the positive electrode elements of the pile. This was accomplished by providing the contact sheets of each electrode element with two openings through which the said rods respectively extended, the opening for one rod being of such size that the rod fitted very closely therein, and the opening for the other rod being of somewhat greater size so that the rod which extended therethrough was spaced from the wall of such opening. The battery pile was then mounted in a suitable battery can or container, preferably formed of nickel-plated steel, which container was filled or nearly filled with an alkaline electrolyte consisting of a solution of caustic soda or caustic potash, thus completing the cell.

It is found, however, that cells constructed as above described become unduly heated both on charge and discharge, that the capacity of such cells, especially at high discharge rates, is considerably below that which should be obtained, and that the capacity decreases to some extent with the length of time the cells are in use. We believe these conditions to be correctly explained as follows: In cells so constructed the surface contact of the nickel conductive sheets and the layers of active material engaging the same is so close and said layers of active material are so compacted because of the great pressure to which said layers were subjected in forming the battery pile, and also because of the pressure under which the piles are maintained, that it is extremely difficult for any appreciable amount of the electrolyte to gain access to the layers of active material except such portions thereof as are directly exposed to or closely adjacent the body of the electrolyte in the cells. The internal resistance and heating of such a cell, both on charge and discharge, are also materially increased by osmotic action. This action takes place in the direction of the flow of current and when the cell is on charge has the effect of driving the small amount of electrolyte which might otherwise reach those portions of the layers of active material of the positive electrode elements which are remote from the body of the electrolyte, away from the adjacent surface portions of the conductive contact sheets of such elements; while when the cell is discharged it has the effect of driving the electrolyte which might otherwise reach the corresponding portions of the layers of active material of the negative electrode elements, away from the adjacent surface portions of the conductive sheets of these elements. When the electrolyte is thus driven away from the conductive contact sheets of the electrode elements, the adjacent active material is rendered practically dry and as such material is a very poor conductor when dry, the electrical resistance thereof and the internal resistance of the cell will thereupon be greatly increased.

One of the principal objects of our invention is to provide an improved form of electrode element for use in battery cells of the type described, whereby in a cell having a battery pile made up of such elements, the circulation of the electrolyte will be so improved or increased as to insure a constant and copious supply of the electrolyte to all portions of the various layers of active material of the electrode elements both on charge and discharge and result in obviating the foregoing objections.

More specifically described, electrode elements embodying our invention comprise sheets of asbestos or other suitable insulating material coated with layers of active material, each of which layers of active material consists of a plurality or series of sections of active material compressed or compacted to a great density separated by a section of sections or active material of less density.

Further objects of our invention are to provide an improved method or process for producing the improved electrode elements, in which process the active material is preferably handled entirely in a dry state, and improved apparatus for carrying out such process. Such improved apparatus comprises the subject matter of our copending application, Serial No. 345,571, filed March 8, 1929, which is a division of the present application.

Other objects and features of our invention will be hereinafter more fully described and claimed.

In order that our invention may be more clearly understood, attention is directed to the drawings accompanying and forming a part of this specification and in which:

Figure 1 is a view in side elevation, partly in section, of one form of our improved apparatus for applying layers of finely divided dry active material to insulating sheets or other supports, in accordance with our invention;

Fig. 2 is a plan view of the apparatus shown in Fig. 1;

Fig. 3 is an end view in elevation, partly broken away, looking from the right in Figs. 1 and 2;

Figs. 4 and 5 are detailed sectional views taken on a line corresponding to the line A—A of Fig. 2, parts being shown in elevation, illustrating how the apparatus is used in applying a layer of active material to each side of an insulating sheet or support;

Fig. 6 is a view similar to Figs. 4 and 5, showing how the apparatus is used in applying a layer of active material to but one side of an insulating sheet or support;

Fig. 7 is a plan view, partly broken away, showing an insulating sheet with finely divided active material applied thereto disposed in the fixture wherein the same is subjected to pressure so as to compact the layer or layers of active material and cause the latter to cohere and become affixed to the insulating sheet;

Fig. 8 is a view in side elevation, partly broken away, of the structure shown in Fig. 7;

Fig. 9 is a plan view of an electrode element in accordance with our invention and comprising an insulating sheet having a layer of active material applied to each side or surface thereto;

Fig. 10 is a sectional view on the line B—B of Fig. 9;

Fig. 11 is a view similar to Fig. 10 showing an insulating sheet or support having a layer of active material applied to but one side or surface thereof, and Fig. 12 is an enlarged detailed sectional view of an electrode element in accordance with our invention showing a portion of the insulating sheet and one layer of the active material applied thereto.

Referring to the drawings, the apparatus for applying the active material to the insulating sheets or other supports comprises a rectangular base 1 provided with suitable means for supporting in a predetermined position a member to which the active material is to be applied, a track T removably mounted on the base 1, and a device A slidably and removably mounted on the track and comprising a hopper for the active material and means actuated in the sliding movement of said device on said track for feeding the active material from said hopper. Secured in any suitable manner to the base 1 at opposite ends of the latter are two transverse bars 2, and secured to the base between said bars and midway between the sides of the base are two cylindrical supports or spacing members 3 which are preferably slightly thicker than the bars 2. The spacing members 3 are secured to the base 1 by means of their reduced downwardly extending cylindrical portions 4, which have a driving fit in openings provided in the base. The spacing members 3 are also provided with reduced upwardly extending cylindrical portions 5 which are of the same size and the same distance apart as the openings provided for the poles in the insulating sheets of the electrode elements. The track T is in the form of a rectangular frame comprising two parallel side rails 6 and 7 rigidly secured together in proper spaced relation by two transverse bars 8 and screws 9 extending through said bars and threaded into the rails. The bars 8 are respectively disposed in recesses provided in the lower sides of the rails 6 and 7 at the ends thereof, the construction being such that the bars 8 when secured to the rails by the screws 9, will be flush with the lower surfaces of the rails. Affixed to each of the bars 8 midway of the length thereof is a cylindrical pin 10. The pins 10 project downwardly from the bars 8, and when the track T is applied to the base 1 these pins respectively engage and fit closely within cylindrical openings 11 provided in and extending through the base 1 and the transverse bars 2, thereby serving to removably and firmly hold the track T in a predetermined position on the base. The rail 6 is provided at the outer side thereof for its entire length with a rectangular recess or cutout portion 12, and a longitudinally extending rack 13 is disposed in said recess 12 and secured to the rail by screws 14.

The device A comprises a substantially cylindrical hollow casing 17 one end of which is integrally formed with the main body portion thereof and the other end 18 of which is formed separately from the said body portion and is removably secured thereto. The casing 17 is of such width as to fit fairly closely between the rails 6 and 7, and is supported for sliding movement on said rails by means of two rectangular bars 19 respectively secured to the ends of the casing by screws 20. The casing 17 is cut away at the bottom to provide the same with a lower flat surface 21, the construction and arrangement being such that when the device A is positioned on the track with the bars 19 engaging the upper surfaces of the rails 6 and 7, as shown in Figs. 1 and 3, the casing 17 will extend down between the rails with the lower flat surface 21 thereof parallel to the base 1 and only a slight distance above the plane of the upper ends of the cylindrical extensions 5 of the members 3. The cylindrical chamber within the casing 17 is substantially of the same length as the width of the layers of active material to be applied to the insulating sheets or other supports in forming the electrode elements, and the casing for substantially the entire length of the said chamber, is provided with a discharge opening 22 intersecting the lower flat surface 21 thereof. The means for feeding material from the hopper of the device A comprises a cylindrical member or barrel 23 which fits closely within the chamber of the casing 17 and is rotatably mounted therein by being secured to a shaft 24 which is journaled in the ends of the casing. The shaft 24 extends outwardly beyond the end wall 18 of the casing 17 and has a gear wheel 25 secured thereto by means of a screw 26. The gear wheel 25 is adapted to mesh with the teeth of the rack 13 in the sliding movement of the device A on the track T, to thereby effect rotary movement of the barrel 23 and cause the latter to remove active material from the hopper and discharge the same through the opening 22. The casing 17 in addition to having the lower cut-away portion providing the flat surface 21, also has an upper inclined cutaway portion intercepting the wall of the chamber in the casing to thereby provide an inlet opening 27 to said chamber for substantially its entire length. The hopper 28 of the device A, is substantially rectangular in shape and is suitably secured at its lower end to the casing 17 tightly about the edges of the said inclined cut-away portion, as shown, so that the hopper has communication with the chamber in the casing 17 through the inlet opening 27.

The cylindrical surface portion of the barrel 23 is provided with a series of similar closely adjacent parallel pockets 29 separated by thin walls or partitions, said pockets extending lengthwise of the barrel and parallel to the axis thereof. The series of pockets 29 corresponds in length and width to the layers of active material of the electrode elements to be produced, and the ends of such series are separated by an unrecessed cylindrical surface portion 30 of the barrel. A portion of the barrel 23 extends into the hopper 28 through the inlet opening 27 and accordingly all of the pockets 29 in such portion of the barrel will under the action of gravity, become filled with the very finely divided active material M with which the hopper is kept supplied, the said material being in a dry loose state and without any binder. The hopper 28 is provided with a transverse wall or partition 31, extending from the right-hand wall thereof and terminating short of the left-hand wall thereof, referring to Fig. 1, so as to divide the hopper into two communicating chambers. By this construction the operator is enabled to readily maintain a sufficient quantity of material in the hopper to provide a constant effective head of such material over that portion of the barrel 23 which projects into the hopper, for when the material falls to the level of the opening between the two communicating chambers provided by the partition 31, this gives an indication to the operator that additional material should be added. The inlet opening 27 in casing 17 is defined at its side edges by knife-edged flanges 32 and 33 provided at the lower end of the hopper 28. During the feeding of material from the hopper 28, the device A is moved on the track T from the right to the left, referring to Figs. 1, 2, 4, 5 and 6, and in such movement the barrel 23 will be rotated, by reason of the engagement of the gear 25 with the rack 13, in the direction of the arrow shown in Figs. 1, 4, 5 and 6. The flanges 32 and 33 at the lower end of the hopper 28 are arranged with the knife edges thereof very closely adjacent the surface of the barrel 23, and so that said knife edges extend at an angle to the pockets 29 whereby in the movement of said pockets past the knife edges each of said pockets will be gradually uncovered as it enters the hopper and gradually covered or cut off from the communication with the hopper as it leaves the latter. In the rotation of the barrel 23 each of the pockets 29 will as it enters the hopper 28 past the knife edge of the flange 32, by reason of the gradual uncovering thereof and the constant effective head of finely divided active material M maintained thereabove, become completely and uniformly filled with such material; and as each of the pockets 29 is moved from the hopper 28 past the knife edge of the flange 33 said knife edge will act to scrape and shear off any small lumps or particles of active material and any portions of such lumps or particles projecting above the pocket. Because of the inclination of the cut-away portion of the casing 17 about which the hopper 28 is secured the effective head of the material M will be greatest over each pocket 29 at the point where it enters the hopper and accordingly each pocket upon entering the hopper, will become filled with a uniform and fairly compact mass of said material. Also by reason of the inclination of the knife edge of the flange 33 with respect to the pockets 29 and the fact that such knife edge is located substantially at the highest point in the path of travel of the surface portion of the barrel and the pockets therein, the shearing action of the knife edge on the particles of material is rendered more effective and the likelihood of any particles or lumps of active material becoming bound between the unrecessed surface portions of the barrel 23 and the flange 33 and the casing 17, is practically obviated. In order to further insure the complete and uniform filling of the pockets 29 in the barrel 23 and the complete discharge of material from the pockets, means is provided for agitating the contents of the hopper 28 to cause the material M to flow freely from the latter into the pockets and for vibrating the drum 23, during the movement of the device A on the rails 6 and 7 in effecting a deposition of a layer of active material on the insulating sheet or other support. As shown, this means comprises a resilient member 34 secured by screws 35 to the end wall 18 of casing 17 and provided adjacent its free end with a downward projection 36 disposed in the path of the teeth of gear 25. Upon rotation of the gear 25 it will be obvious that the teeth thereof will vibrate the resilient member 34 and that thereby vibrations will be imparted to the entire hopper device A.

The outer surface of the gear 25 is provided with a radial indicating mark I which is registered with a similar mark I' provided on the end 18 of casing 17 so as to set the barrel 23 in the proper angular position in casing 17, when the device A is positioned on the right hand end of track T, referring to Fig. 1, preparatory to moving said device along said track in applying a layer of finely divided active material to the presser plate or insulating sheet supported on the base 1, as hereinafter described.

In Figs. 9 and 10 we have shown an electrode element in accordance with our invention consisting of a rectangular insulating sheet 40 formed of asbestos or other suitable fibrous insulating material and having on one side a thin layer 41 of iron-containing material such as iron or oxide of iron, and on the other side a thin layer 42 of nickel hydroxide. Adjacent its ends and midway between its side edges the insulating sheet 40 is provided with circular openings 43 through which the poles of the battery pile extend when a plurality of the electrode elements are assembled, as described above, into such a pile. The sheet 40 is also provided centrally thereof with a smaller circular opening 44, and when a plurality of elements such as described are assembled into a battery pile the central openings in the insulating sheets thereof provide a path for the circulation of electrolyte. To prevent the layers of active material on the insulating sheet 40 from shedding or being broken off at their edges and from coming into contact with the poles which are to extend through the openings 43, and in order to further facilitate the circulation of electrolyte, each surface of the said sheet is provided with uncovered portions carrying no active material, namely, the edge portions 45, and the channeling consisting of the annular portions 43' and 44' and the straight, narrow portions 46, 46 located midway of the edges of the sheet and extending between the said annular portions.

The element shown in Fig. 11 is similar in all respects to that shown in Figs. 9 and 10, except that the insulating sheet 40' thereof is preferably somewhat thinner than the insulating sheet 40 and has a layer of active material 47 applied to but one side thereof.

Each of the layers of active material of the element shown in Figs. 9 and 10 and also the single layer of active material of the element shown in Fig. 11, consists of a continuous dense coherent channeled sheet of finely divided active material firmly adhering to the insulating sheet. Each such layer of material, however, comprises portions of different densities and, referring to Fig. 12, is preferably composed of a series of similar slightly spaced parallel sections 48 extending transversely of the insulating sheet 40 or 40', as the case may be, separated by sections 49, the sections 48 being compacted under pressure to such an extent as to be very dense and only slightly permeable by the electrolyte and the sections 49 being much less dense and much more readily permeable by the electrolyte. It will be apparent that the less dense sections 49 of each of the layers of active material in the elements described, or at least a majority of such sections, are intercepted by and therefore in direct communiation with the channeling extending through such layer at the central portion thereof and consisting of the channels 46, 46 and the circular enlargements thereof provided by the annular, uncovered portions 43' and 44' of the insulating sheet, and that through such channeling the said sections 49 are also in communication with the central opening 44 of the insulating sheet. These sections 49 form paths whereby the electrolyte may more readily reach all portions of the layers of active material, and they cooperate with the openings 44 in the insulating sheets and the channeling extending through the layers of active material to further facilitate and increase the circulation of electrolyte through an assembled battery pile. The active material is applied to the insulating sheet of an element such as shown in Figs. 9 and 10, so that the channelings in the two layers of such material and the corresponding sections of such layers are in alignment.

The surface portion of the barrel 23 having the closely adjacent parallel pockets 29 therein is provided with a central solid or unrecessed section 29' corresponding in shape to the channeling and the circular enlargements of such channeling with which each layer of an electrode element, such as shown and described herein, is provided. The purpose of such solid or unrecessed portion 29, as will be obvious, is to block out and prevent the deposition of active material on a portion of the support or insulating sheet to which a layer of active material is applied in the operation of the device A, corresponding with the channeling in each layer of active material of the completed element.

In producing an element such as shown in Figs. 9 and 10, we proceed as follows: A flat rectangular presser plate P of the same length as the insulating sheet 40 but slightly wider than the latter and having semi-cylindrical recesses 50 in its side edges and adjacent its ends, is mounted on the spacing members or supports 3 carried by the base 1, with the circular openings 5' provided therein adjacent its ends engaged by the reduced cylindrical extensions 5 of the members 3. The gear 25 of the device A is turned to a position in which the indicating mark I thereon registers with the indicating mark I' on the end 18 of casing 17 so as to properly position the barrel 23 within the latter. The device A with the hopper 28 full of the dry loose finely divided active material to be deposited, for example, finely divided iron or oxide of iron, is then mounted, referring to Figs. 1, 2, 4 and 5, on the right hand end of track T just beyond the adjacent end of the rack 13 and is moved to the left so as to traverse the presser plate P for its entire length. In this movement of the device A a layer 41' of finely divided iron is deposited from the pockets 29 of the barrel 23 through the discharge opening 22 onto the upper surface of the presser plate P, such layer being of the same extent and configuration as the layer 41 of the finished element except that it is made up of a series of transversely extending slightly spaced parallel and uniform sections 48' of loose finely divided active material. The device A is now removed from the track T, the insulating sheet 40 is placed on the layer 41' with the extensions 5 of the spacing members 3 engaging the openings 43 in said sheet, and a device identical with the device A, but having its hopper filled with finely divided nickel hydroxide in a dry loose state and free from any binder, is mounted on the right hand end of the track T with the feeding barrel thereof turned to the proper angular position, and this device is then moved on the track towards the left to traverse the sheet 40 and deposit thereon a layer 42' of active material. The layer 42' is identical with the layer 41' deposited on the presser plate P, except that it is formed of a series of slightly spaced parallel sections of finely divided nickel hydroxide. The track T and the depositing or hopper device mounted thereon are then removed from the base 1. A second presser plate P' similar to the presser plate P except that it is provided at its side edges with lateral extensions 51 carrying two pairs of pins 52, is then placed on the layer 42' of active material with the pins 52 thereof engaging the recesses 50 of the plate P. The fixture consisting of the two presser plates P and P' with the two layers 41' and 42' of active material and the interposed insulating sheet 40 disposed therein, is then removed from the base 1 and subjected to an enormous pressure, preferably a pressure of from two to ten tons per square inch, in a hydraulic press. Under this pressure each of the layers 41' and 42' of dry loose finely divided active material is compacted and the sections 48' thereof are spread out and merged so as to form a continuous dense coherent sheet or layer of uniform thickness with a smooth flat surface. Each such sheet, however, will, as indicated in Fig. 12, consist of a series of slightly spaced very dense parallel sections 48, corresponding to the sections 48' deposited on the presser plate P and insulating sheet 40 from the hopper devices, and relatively narrow intermediate parallel sections 49 of much less density which are formed by the merging of the edge portions of the adjacent sections 48' under the pressure to which the latter were subjected in the fixture consisting of the presser plates P and P'.

An element such as that shown in Figs. 9 and 10 may also be produced by joining two elements each consisting of an asbestos or other insulating sheet having a channeled layer of active material on but one side thereof, and in producing such a composite element we proceed as follows: A presser P with an insulating sheet 40' thereon is mounted on the spacing members 3 carried by the base 1, with the cylindrical extensions 5 of said spacing members engaging the openings 5' in the presser plate and the corresponding openings 43 in the insulating sheet, as shown in Fig. 6. A layer 47' of dry loose finely divided active material consisting of a series of transversely extending slightly spaced parallel sections of such material, is then deposited on the sheet 40' from the pockets 29 of the barrel 23 of the hopper device, in the manner above described. The track T and the hopper device A are then removed from the base 1, and the presser plate P' is placed on the layer of active material 47' with the pins 52 thereof engaging the recesses 50 in the plate P. The fixture consisting of the plates P and P' with the insulating sheet 40' and the layer 47' of active material disposed therein, is then removed from the base 1 and subjected to enormous pressure, as above described, to compact and form the layer of active material 47' into a dense coherent sheet 47 of uniform thickness made up of very dense slightly spaced parallel sections and relatively narrow intermediate parallel sections of less density and at the same time to unite such layer firmly with the insulating sheet 40'. This results in an element such as that shown in Fig. 11. Two such elements are then assembled with the uncoated surfaces of the insulating sheets thereof in engagement and with the channelings and corresponding sections of their layers of active material in alignment, between presser plates, and such assembly is subjected to a heavy pressure so as to firmly unite the insulating sheets. The layers of active material on the two asbestos or other insulating sheets thus united should, of course, be respectively formed of nickel hydroxide and iron or oxide of iron.

It is to be distinctly understood that the electrode elements as well as the method and apparatus for producing the same, specifically described herein, are subject to various changes and modifications without departure from the spirit of our invention and the scope of the appended claims.

Having now fully described our invention, what we claim as new and desire to protect by Letters Patent is as follows:

1. An element for storage battery cells, comprising a support having applied thereto a layer of active material, said layer having an outer surface portion lying substantially in one plane and outwardly of which no part of such layer extends whereby such surface portion is adapted to make close uninterrupted contact with a flat member, that part of said layer which corresponds to said surface portion comprising sections of different but positive densities.

2. An element for storage battery cells, comprising a support having applied thereto a layer of active material, said layer having an outer surface portion lying substantially in one plane and outwardly of which no part of such layer extends whereby such surface portion is adapted to make close uninterrupted contact with a flat member, that part of said layer which corresponds to said surface portion comprising spaced dense sections and a section of less but positive density between each two adjacent dense sections.

3. An element for storage battery cells, comprising a flat support and a layer of active material applied to said support, said layer having an outer surface portion lying substantially in one plane and outwardly of which no part of such layer extends whereby such surface portion is adapted to make close uninterrupted contact with a flat member, that part of said layer of active material corresponding to said surface portion comprising a series of spaced sections compacted into dense coherent masses adhering to said support, said masses being separated by sections of said active material of less but positive density.

4. An element for storage battery cells, comprising a flat support or sheet having applied to each of its opposite surfaces a layer of finely divided active material having a substantially plane outer surface, the said outer surface of each of said layers being adapted to make close contact with a flat member over an area substantially coextensive with the area of the respective layer, each of said layers of active material comprising a series of spaced dense sections and intermediate sections of less but positive density, the corresponding sections of the layers of active material on the opposite sides of said support or sheet being aligned.

5. An element for storage battery cells, comprising an insulating sheet having a layer of finely divided nickel hydroxide applied to one side thereof and a layer of finely divided electrolytically active iron applied to the opposite side thereof, each of said layers comprising sections of different densities, substantially as described.

6. An element for storage battery cells, comprising an insulating sheet having a layer of finely divided nickel hydroxide applied to one side thereof and a layer of finely divided electrolytically active iron applied to the opposite side thereof, each of said layers comprising a series of spaced dense sections and intermediate sections of less density, the corresponding sections of the layers on the opposite sides of the sheet being aligned, substantially as described.

7. An element for storage battery cells, comprising a fibrous insulating sheet having applied to each of its opposite surfaces a layer of finely divided active material, each of said layers comprising a series of spaced sections compacted into dense coherent masses adhering to said sheet and intermediate sections of less density, substantially as described.

8. An element for storage battery cells, comprising an insulating support and finely divided active material applied to such support, said active material being compacted by pressure from a dry loose state into a coherent layer firmly united to said support, said layer comprising spaced dense sections and intermediate sections of less density, substantially as described.

9. An element for storage battery cells, comprising a support having an opening therethrough and a layer of finely divided active material applied to said support, said layer comprising sections of different densities, the sections of lesser density having communication with said opening, substantially as described.

10. An element for storage battery cells, comprising a support having an opening therethrough and a layer of finely divided active material applied to said support, said layer comprising spaced dense sections and intermediate sections of less density, the said intermediate sections having communication with said opening, substantially as described.

11. An element for storage battery cells, comprising a support having an opening therethrough and a layer of finely divided active material applied to each of the opposite surfaces of said support, each of said layers comprising spaced dense sections and intermediate sections of less density, the said intermediate sections having communication with said opening, substantially as described.

12. An element for storage battery cells, comprising a support having an opening therethrough and a layer of active material applied to said support, said layer having channeling therein communicating with said opening and comprising spaced dense sections and intermediate sections of less density, the said intermediate sections having communication with said channeling, substantially as described.

13. An element for storage battery cells, comprising a support having an opening therethrough and a layer of active material applied to said support, said layer having channeling therethrough communicating with said opening and comprising spaced dense sections and intermediate sections of less density, the said intermediate sections having communication with said channeling, substantially as described.

14. An element for storage battery cells, comprising a support having applied thereto a layer of finely divided active material, said layer having an outer surface portion lying substantially in one plane and outwardly of which no part of such layer extends whereby such surface portion is adapted to make close uninterrupted contact with a flat member, that part of said layer corresponding to said surface portion having channeling therein and comprising spaced dense sections and intermediate sections of less density, the said intermediate sections having communication with said channeling.

15. An element for storage battery cells, comprising a support having an opening therethrough and a layer of active material applied to each of the opposite surfaces of said support, each of said layers having channeling therein communicating with said opening and comprising spaced dense sections and intermediate sections of less density, the said intermediate sections having communication with said channeling, substantially as described.

16. An element for storage battery cells, comprising a support having applied to each of its opposite surfaces a layer of active material having a substantially plane outer surface, each of said outer surfaces being adapted to make close contact with a flat member over an area substantially coextensive with the area of the respective layer, each of said layers of active material comprising spaced dense sections and intermediate sections of less density and having channeling therethrough intercepting said sections.

17. The method which consists in applying to a support a plurality of spaced sections of finely divided active material, and then subjecting the said support with the active material applied thereto to a pressure sufficient to spread and merge said sections and compact the active material into a coherent layer and firmly unite the same with said support, substantially as described.

18. The method which consists in applying to a support a series of slightly separated masses of finely divided active material in a dry, loose state, and then subjecting said support with the active material applied thereto to a pressure sufficient to spread and merge said masses and compact the active material into a coherent layer and firmly unite the same with said support, substantially as described.

19. The method which consists in applying to each side of a sheet a plurality of spaced sections of finely divided active material, and then subjecting said sheet with the active material applied thereto to a pressure sufficient to spread and merge the sections of active material on each side of the sheet and compact such sections into a coherent layer and firmly unite the same with the sheet, substantially as described.

20. The method which consists in applying to each side of a sheet a series of slightly spaced sections of finely divided active material with the corresponding sections on the opposite sides of the sheet in alignment, and then subjecting said sheet with the active material applied thereto to a pressure sufficient to spread and merge the sections of active material on each side of the sheet and compact such sections into a coherent layer and firmly unite the same with the sheet, substantially as described.

21. An element for storage battery cells, comprising a support having applied thereto a layer of active material, said layer comprising portions of different densities and having a substantially plane outer surface adapted to make close contact with a flat member over an area substantially coextensive with the area of such layer.

22. An element for storage battery cells, comprising a support having applied thereto a layer of active material, said layer comprising a portion having an outer surface lying substantially in one plane and adapted to make close uninterrupted contact with a flat member, said portion of the layer of active material comprising sections of different but positive densities.

23. The method which consists in applying a layer of finely divided active material consisting of sections of different densities to one surface of each of two sheets of fibrous material, super-imposing said sheets of fibrous material with their uncoated surfaces in contact, and then subjecting the super-imposed sheets to a pressure sufficient to firmly unite the same, substantially as described.

24. The method which consists in applying a layer of finely divided active material consisting of sections of different densities to one surface of each of two sheets of fibrous material, super-imposing said sheets of fibrous material with their uncoated surfaces in contact and with the corresponding sections of the layers of active material in alignment, and then subjecting the super-imposed sheets to a pressure sufficient to firmly unite the same, substantially as described.

This specification signed this 3rd day of June, 1926.

PAUL D. PAYNE.
MORTON IVERSEN.

CERTIFICATE OF CORRECTION.

Patent No. 1,821,572. Granted September 1, 1931, to

PAUL D. PAYNE ET AL.

It is hereby certified that error appears in the printed specification of the above numbered patent requiring correction as follows: Page 4, line 45, strike out the article "the"; page 5, lines 45 and 46, for the misspelled word "communiation" read communication; page 8, line 56, claim 21, after "different" insert the words but positive; and that the said Letters Patent should be read with these corrections therein that the same may conform to the record of the case in the Patent Office.

Signed and sealed this 22nd day of March, A. D. 1932.

(Seal)

M. J. Moore,
Acting Commissioner of Patents.